Patented Nov. 5, 1946

2,410,685

UNITED STATES PATENT OFFICE 2,410,685

HOT MELT-COATING COMPOSITION

Martin Salo and Harold F. Vivian, Rochester, N. Y., assignors to Eastman Kodak Company, Rochester, N. Y., a corporation of New Jersey No Drawing. Application October 18, 1945, Serial No. 623,187

9 Claims. (Cl. 106—181)

This invention relates to coating compositions, said compositions being suitable for application in a molten condition known as hot-melts.

Cellulose derivative compositions have been employed heretofore in the coating of paper, cloth, metal and the like by dissolving in an organic solvent and forming a layer upon the surface to be coated whereupon the solvent was evaporated. Although this method has found quite extensive use, it has involved the handling of organic solvents and solvent recovery systems to reclaim the vapors which are given off from the coating. Also, these coating methods have necessitated a long period of curing thereby adding to the complexity of the process.

Other methods of coating have been suggested such as by lamination or by applying a hot melt to a surface. For the hot melt coating procedure, some compositions have been recommended but in none of these compositions have organic acid esters of cellulose been used to any substantial extent, particularly where the acyl of the cellulose ester was composed of lower fatty acid radicals. With many of the hot melt coating compositions there have been various features which were undesirable such as tackiness, extraordinary softness, opaqueness, brittleness or the like and consequently for the application of cellulose ester coatings volatile solvent solutions are still employed for various purposes.

One object of our invention is to provide a novel composition which is of value as a non-blocking melt-coating composition to make possible the coating of surfaces without the use of a volatile solvent. Another object of our invention is to provide a practicable melt-coating composition which gives hard moisture-proof coatings which are free of tackiness, brittleness and opaqueness. A further object of our invention is to provide a cellulose ester composition which can be used for melt coating purposes at temperatures such as 170° C. or below, which will not have a derogatory effect on paper. A still further object of our invention is to provide a composition which, in use, in melt coating operations goes through a gel state at a fairly high temperature such as 130–140° C. characterized by sudden setting which is highly desirable in obtaining a valuable product.

We have found that all of the characteristics set out may be obtained in compositions which are specifically limited as to the type of cellulose ester, the plasticizers employed and the proportions of the various materials which are present. We have found that compositions of high butyryl butyric acid esters of cellulose as prescribed herein mixed with capryl (octanol-2) phthalate, ethoxyethyl phthalate, or butoxyethyl phthalate and butyl stearate in certain proportions exhibit highly desirable properties for melt coating purposes in contrast to the commonly held opinion as regards cellulose ester compositions for melt coating purposes. The compositions of our invention essentially consist of high butyryl cellulose esters of a certain limited type mixed with a minor proportion of a mixture of a phthalate as specified and butyl stearate as will be described in more detail hereinafter.

The cellulose esters which form one of the constituents of the compositions in accordance with our invention are cellulose esters having a butyryl content of at least 42% and which have been hydrolyzed no more than to a small extent. It is preferred that the esters will have been hydrolyzed to a small extent to increase their heat stability. However, generally the cellulose esters should have not more than two hydroxyl groups per 24 carbon atoms. If the ester is substantially a triester, it is necessary that it be a stable cellulose compound. The cellulose esters which have been found to be most suitable for use in accordance with our invention are those cellulose esters having at least 42% butyryl, the remainder of the acyl being acetyl. Ordinarily the presence of not more than 10% of acetyl is desired. If any other acyl than butyryl is employed, it is desirable that it be present in a sufficiently small amount that it does not influence the character of the cellulose ester. The cellulose ester may be a cellulose butyrate, a cellulose acetate butyrate, a cellulose propionate butyrate or a cellulose acetate propionate butyrate or perhaps even a few per cent of some acyl groups higher than butyryl may be present providing the groups other than acyl are not present in an amount sufficient to substantially influence the character of the cellulose ester. The butyric acid esters of cellulose which are suitable for forming the compositions in accordance with our invention take in but a very small portion of the field of butyric acid esters of cellulose. It is preferable that the acyl groups present in the ester are substantially those of fatty acids of no more than four carbon atoms, which esters will be referred to herein as "lower fatty acid esters of cellulose."

The butyric acid esters of cellulose which are suitable for use in the compositions of our invention are still further restricted as to various other characteristics. The butyric acid esters which are useful for our compositions must have a melting point of less than 200° C., a char point of at least 260° C. and preferably 300° C. and a fundamental cuprammonium viscosity of not more than 10 centipoises and preferably of not more than five centipoises. The esters which are suitable for use in melt-coating compositions in accordance with our invention have an acetone viscosity within the range of 5–200 centipoises, this being the viscosity of one part of ester dissolved in nine parts of acetone at a temperature of 25° C. To aid in the selection of the cellulose ester having optimum properties in a melt coating composition, it may be stated that with the cellulose esters having butyryl contents in the lower part of the range given, such as from 42 to 46% butyryl, the best results are obtained with those esters which have little or no hydroxyl therein but the esters must be heat stable. With esters of this butyryl content, compositions having the best fluidity are obtained with the near fully esterified type esters.

The relative proportion of phthalate and butyl stearate in the composition depends upon the butyryl content of the cellulose ester employed. For instance, with ethers in the lower part of the butyryl range given, the phthalate (capryl, ethoxyethyl or butoxy-ethyl or their mixture) should be present in greater amount than butyl stearate whereas with esters in the higher butyryl portion of the range given it is desirable that the butyl stearate be present in greater proportion than the phthalate. In the intermediate portion of the range, some variation is permissible. For example, with the use of a butyric acid ester of cellulose having a butyryl content of 42–44% the ratio of phthalate to butyl stearate may be 4 to 1 or even up to 6 to 1 whereas with a butyric acid ester of cellulose having a butyryl content of 55% the ratio of phthalate to butyl stearate may be 1 to 4 or even 1 to 6. Ordinarily it is desirable for optimum properties that the ratio of phthalate to butyl stearate be from 4 to 1 on the lower end of the butyryl content range of the cellulose ester to approximately 1 to 4 on the upper end of the butyryl content range. In the middle portion of the range such as with a butyryl content of 47 to 50%, the ratio of phthalate to butyl stearate may range from ½ to ¼ to give products without any tendency towards tackiness. Obviously, in cases where a slight tendency to tackiness is not objectionable, a more liberal range is permissible than in cases where even the least suggestion of tackiness is undesirable.

The test employed to determine the degree of tackiness was to place the coatings face to face at 75° C. for seventeen hours using a pressure of 4.5 pounds per square inch. Satisfactory freedom from tackiness was considered freedom from any sticking whatever in this test. If a ratio of 4 to 1 of phthalate to butyl stearate is employed in the lower part of the described butyryl range up to 1 to 4 in the upper part of the range and intermediate values are employed for intermediate esters, satisfactory freedom from tackiness is obtained.

In compositions in accordance with our invention, the ratio of the cellulose ester to the mixture of phthalate and butyl stearate, which mixture may be referred to as plasticizer, is found within the range of 1 to 1 to 4 to 1 (or 100% to 25% plasticizer based on the weight of the cellulose ester) the object being to obtain a composition having a fluidity for coating at a reasonable temperature, such as about 170° C. The amount of plasticizer necessary is best determined by the acetone viscosity of the cellulose ester being used as a criterion, the higher viscosity esters needing more plasticizer, or, in lieu thereof a higher temperature for the coating operation. As working temperatures around 160 C. or 170° C. are the most desirable for melt coating operations, ordinarily with the higher viscosity esters a higher proportion of plasticizer will be used. This is especially true for the coating of paper in which a temperature of about 170° C. is the maximum which can be used without breakdown or some other effect upon the paper sheet. For the guidance of anyone performing the melt coating operation, it may be stated that with an ester having a 200 centipoise acetone viscosity either the ratio of ester to plasticizer should be approximately 1 to 1 or otherwise a higher coating temperature such as 200–210° C. is necessary. Such a higher temperature is unsuitable for the coating of paper but may be employed for the coating of materials such as metal or cloth which will not be deteriorated by those temperatures. If a 100 centipoise acetone viscosity cellulose ester is employed, the ratio of ester to plasticizer may be 7 to 3. Obviously, if desired, a greater proportion of plasticizer could be employed but usually it is preferred that the amount of plasticizer used be kept to a minimum. With an ester of this viscosity, a composition of four parts of ester to one of plasticizer could be employed provided the coating operation was carried out at a temperature higher than 160–170° C. With the esters in the lower part of the range of acetone viscosity such as 5 or 10 centipoises, the composition may be made up of four parts of ester to one part of plasticizer without using a high temperature for coating. If one desires to employ an elevated temperature, the proportion of plasticizer could even be less. It is also desirable to keep the temperature for the operation down to aid in the stability of the composition in the melt coating operation. For instance, if the composition is kept at a temperature of 170° C. for a matter of 8 to 10 hours, or possibly longer, in some cases some discoloration or detrimental effect may occur, although with esters of good stability and high char point this hazard is reduced to a minimum. This effect may also be guarded against if desired by adding a very small proportion of an antioxidant such as hydroquinone to the composition. Because of the fact that the composition is subjected to an elevated temperature, sometimes for a long period of time, it is desirable that the composition be free of any material which will discolor or decompose in the use to which the composition is put.

The compositions in accordance with our invention may be obtained by mixing the cellulose esters in comminuted form with the phthalate and butyl stearate at a temperature of about 150–170° C. It is preferred that the cellulose ester be finely divided such as may be obtained by a ball milling operation. As intimate mixing of the cellulose ester and plasticizer is necessary, stirring is desirable in the formation of the composition. One procedure by which our composition may be made and used for melt coating is to intimately mix the cellulose ester in comminuted form with the plasticizer mixture followed by passing the resulting composition between heated rolls thereby causing a softening or melting together of the ingredients. After forming the sheet or film, it may then be broken up into small granules, which granules may be conveniently stored. For coating, the granules may be melted in a heated extrusion apparatus or heated mixing equipment of suitable design and fed into a melt-coating machine, particularly one which operates in a continuous manner. In this way the composition is not kept in a melted condition for a very long period of time prior to coating and it is, therefore, unnecessary to store large quantities of composition in a molten condition.

The result desired by the melt coating operation is to obtain a coated material in which the coating has a somewhat rigid structure. In this way a moisture-proof non-tacky sheet is obtained. As was pointed out above, our invention is particularly directed to enabling the melt coating of paper in which a temperature of not more than 170° C. must be employed for the coating operation. The paper which is coated may be either an ordinary paper such as Kraft or a highly refined paper such as prepared from high α-cellulose.

The classical methods of coating devised for all types of viscous coating compositions can be used with these hot melt compositions provided the apparatus can be heated to the point necessary to keep the melt adequately fluid. The coating methods can be classed into four categories, namely, the knife, the roll, the casting, and extrusion methods.

Roll coating, which to date seems the most practical for melt coating, can be divided into the following types: contact, squeeze and rotogravure methods. In all of the roll coating methods the coating after application onto a web is in a rough form and must be polished or smoothed by a method such as passing the coated web over a heated bar of a special design or over a heated roll rotating in a direction opposite to that of the web or by ferrotyping under suitable conditions on a ferrotyping drum.

In the contact method of roll coating, a common design is one which employs two heat rolls rotating in opposite directions, one above the other, the lower one of which picks up the molten composition from a heated hopper and meters it to the top roll over which the web is passed; the coating is thus picked up by the web, which in turn passes over a smoothing apparatus such as a heated bar, following which the coated web passes over cooling rolls to harden the coating. The apparatus must be heated either with oil, Dowtherm, etc., or directly by electrical heaters. Coating apparatus of this type is described in U. S. Patents, Nos. 2,070,563, 2,117,199, 2,117,200, 2,189,758, 2,190,843 and 2,214,787 of B. C. Miller and John Waldron Corporation. These machines can be adapted to squeeze roll coating by passing the web between the two coating rolls instead of over the top roll as in the contact coating method. With the squeeze roll method it is possible to coat both sides of the web simultaneously if the melt is provided for the top of the paper by a suitable hopper on the top roll and to the bottom roll by the regular hopper described in the contact method. In addition, smoothing apparatus such as a blade for one or both sides may be provided.

The rotogravure method comprises applying the melt to the web from a heated intaglio roll which picks up the melt from a heated hopper. The excess melt is doctored from the roll prior to contact with the web which is squeezed against the intaglio roll by another roll. In this method it is also necessary to employ a smoothing apparatus of some kind or another. This melt-coating apparatus is described in Beveridge-Marvellum Company, U. S. Patents Nos. 2,312,927, 2,249,089, and 2,163,712.

The cellulose esters which are employed in preparing our compositions are prepared by reacting upon cellulose with butyric anhydride, preferably after a presoaking or pretreatment with a small amount of acetic acid. For instance, by means of a pretreatment such as described and claimed in Malm patents, Nos. 2,342,415 and 2,342,416, the cellulose is activated using only a small proportion of acetic acid. Esterification of this ester with butyric anhydride and catalyst such as by the method described and claimed in Blanchard Patent No. 2,304,792 or Malm patents, Nos. 2,362,576 and 2,345,406, results in a high butyryl cellulose ester. The ester may then be hydrolyzed preferably only for a sufficient time to reduce the sulfur content of the ester.

The cellulose esters which we prefer to use in compositions in accordance with our invention are those which have been stabilized. Methods of stabilizing cellulose esters suitable for use here are described and claimed in Malm and Kirton Patent No. 2,250,201 and in Malm and Salo Patent No. 2,371,768. The esters, after stabilizing in accordance with this process have a char point of at least 260° and usually approximately 300° or more and a melting point considerably below its char point. Compositions in accordance with our invention in which these esters are used may be subjected to melting temperatures for the time necessary to perform coating operations without detrimentally affecting the composition. It is desirable that little, if any, additional material be mixed with coating composition in accordance with our invention. Obviously, if colored coatings are desired, a very small proportion of dye might be incorporated. The following examples illustrate the use of our compositions for melt coating purposes.

*Example 1*

350 g. of a heat stable cellulose acetate butyrate having a butyryl content of approximately 48% and an acetyl content of approximately 6% and a viscosity of 24.9 centipoises at 25° C. in a 10% solution of acetone, in powdered form (so that powdered ester passes a 40-mesh screen) were mixed in a Werner-Pfleiderer mixer with 75 parts of butyryl stearate and 75 parts of dicapryl phthalate until a uniform mixture was obtained. The composition was then employed in a hot melt-coating machine by melting at 170° C. and flowing out the melt composition onto a strip of paper which then passes over a blade or knife for smoothing purposes. The composition used for the coating process was a stable melt having a good color. The material was deposited in the form of a thin layer upon the paper, forming a permanent non-tacky coating thereon.

*Example 2*

350 g. of a heat stable cellulose acetate butyrate in powdered form having a butyral content of approximately 48% and an acetyl content of approximately 6% and a viscosity of 25 centipoises at 25° C. in a 10% solution of acetone were mixed with 50 parts of butyl stearate and 100 parts of diethoxyethyl phthalate until complete mixing was obtained. The resulting product was employed in a hot melt-coating machine and employed to coat photographic paper. The resulting coating upon the paper after running over the smoothing bar and allowing to cool gave a product having a brilliant surface and the coating formed was found to be non-tacky and water-resistant.

*Example 3*

350 g. of cellulose acetate butyrate in powdered form as described in the preceding examples were thoroughly mixed with 100 g. of butyl stearate and 50 g. of butoxyethyl phthalate. This composition was melted at 170° C. in a hot melt-coating machine and was coated onto both sides of a photographic paper, thus forming a coating which is non-tacky and water-resistant.

*Example 4*

350 g. of cellulose acetate butyrate referred to in the preceding examples in powdered form were mixed with 120 g. of butyl stearate and 30 g. of capryl phthalate. The mass was then melted in a hot melt-coating machine and coated out onto a surface of a sheet of paper which upon drying contained a coating of good characteristics.

The various phthalates listed in the application as being suitable for plasticizing butyric acid esters of cellulose are suitable in the various proportions given in the examples with any one of them, and it is to be understood that the invention defined by the claims of this application is not limited by the examples.

The phthalates which we have found useful for forming non-blocking compositions when mixed with butyl stearate as described are those in which both carboxyls of the phthalic acid are esterified with capryl (octanol-2), ethoxyethyl, or butoxyethyl groups forming dicapyrl phthalate, di-ethoxyethyl phthalate, or dibutoxyethyl phthalate, respectively. Included are those phthalates which are mixed as regards the three groups listed. Whenever the term "phthalate" standing alone is used in this application, it is to be understood as referring to the phthalates having capryl, ethoxyethyl and/or butoxyethyl groups as described.

Our melt-coating process is particularly adapted to the coating of cellulose webs such as paper or cloth. For instance, cloth or paper melt coated as described using a coating of appropriate color and embossed to impart an appropriate grain results in a good grade of artifical leather. However, our process may be used for coating non-cellulosic surfaces, particularly of sheeting, such as aluminum (or other metal) foil, glass, wire, netting, asbestos paper, silk fabric, wood, leather, etc., to impart a smooth, th'n protective coating thereto.

We claim:

1. A non-blocking hot melt-coating composition essentially consisting of a cellulose ester having a butyryl content of at least 42%, hydrolyzed to no more than two hydroxyl groups per 24 cellulose carbon atoms a melting point less than 200° C., a char point of at least 260° C. a cuprammonium viscosity of not more than 10 centipoises, and an acetone viscosity of 5–200 centipoises and 25–100% (based on the weight of the cellulose ester) of a mixture of butyl stearate and a phthalate selected from the group consisting of dicapryl phthalate, diethoxyethyl phthalate, and dibutoxyethyl phthalate, both components of the plasticizer mixture being present in an amount at least 20% of that mixture.

2. A non-blocking hot melt-coating composition essentially consisting of cellulose acetate butyrate having a butyryl content of approximately 47–50%, hydrolyzed to not more than two hydroxyl groups per 24 cellulose carbon atoms, a melting point of less than 200° C., a char point of at least 260° C., a cuprammonium viscosity of not more than 10 centipoises and an acetone viscosity of 5–200 centipoises and 25–100% (based on the weight of the cellulose ester) of a mixture of a phthalate selected from the group consisting of dicapryl phthalate, ethoxyethyl phthalate and butoxyethyl phthalate and butyl stearate, the ratio of the former to the latter being within the range of ⅜ to ¼, the composition being adapted when applied, from a molten condition to give a non-tacky, abrasion-resisting coating.

3. A non-blocking hot melt-coating composition essentially consisting of cellulose acetate butyrate having a butyryl content of at least 42%, hydrolyzed to not more than two hydroxyl groups per 24 cellulose carbon atoms, a melting point of less than 200° C., a char point of at least 260° C., a cuprammonium viscosity of not more than 10 centipoises and an acetone viscosity of 5–200 centipoises, an antioxidant and 25–100% (based on the weight of the cellulose ester) of a mixture of butyl stearate and a phthalate selected from the group consisting of dicapryl phthalate, ethoxyethyl phthalate, and butoxyethyl phthalate, both components of the plasticizer mixture comprising at least 20% of that mixture, the composition being adapted when applied from a molten condition to give a non-tacky, abrasion-resistant coating.

4. A non-blocking hot melt-coating composition essentially consisting of a cellulose ester having a butyryl content of at least 42%, hydrolyzed to no more than two hydroxyl groups per 24 cellulose carbon atoms a melting point less than 200° C., a char point of at least 260° C., a cuprammonium viscosity of not more than 10 centipoises and an acetone viscosity of 5–200 centipoises and 20–100% (based on the weight of the cellulose ester) of a mixture of dicapryl phthalate and butyl stearate, both components of the plasticizer mixture present in an amount at least 20% of that mixture.

5. A non-blocking hot melt-coating composition essentially consisting of a cellulose ester having a butyryl content of at least 42%, hydrolyzed to no more than two hydroxyl groups per 24 cellulose carbon atoms a melting point less than 200° C., a char point of at least 260° C., a cuprammonium viscosity of not more than 10 centipoises and an acetone viscosity of 5–200 centipoises and 20–100% (based on the weight of the cellulose ester) of a mixture of ethoxyethyl phthalate and butyl stearate, both components of the plasticizer mixture being present in an amount at least 20% of that mixture.

6. A non-blocking hot melt-coating composition essentially consisting of a cellulose ester having a butyryl content of at least 42%, hydrolyzed to no more than two hydroxyl groups per 24 cellulose carbon atoms, a melting point less than 200° C., a char point of at least 260° C., a cuprammonium viscosity of not more than 10 centipoises and an acetone viscosity of 5–200 centipoises and 20–100% (based on the weight of the cellulose ester) of a mixture of butoxyethyl phthalate and butyl stearate, both components of the plasticizer mixture being present in an amount at least 20% of that mixture.

7. A cellulose web having on at least one of its surfaces a melt coating essentially consisting of a cellulose ester having a butyryl content of at least 42% hydrolyzed to no more than two hydroxyl groups per 24 cellulose carbon atoms a melting point less than 200° C., a char point of at least 260° C., a cuprammonium viscosity of not more than 10 centipoises and an acetone viscosity of 5–200 centipoises and 25–100% (based on the weight of the cellulose ester) of a mixture of butyl stearate and a phthalate selected from the group consisting of dicapryl phthalate, diethoxyethyl phthalate, and dibutoxyethyl phthalate, both components of the plasticizer mixture being present in an amount at least 20% of that mixture.

8. Paper having on at least one of its surfaces a melt coating essentially consisting of a cellulose acetate butyrate having a butyryl content of approximately 47–50%, hydrolyzed to not more than two hydroxyl groups per 24 cellulose carbon atoms, a melting point of less than 200° C., a char point of at least 260° C., a cuprammonium viscosity of not more than 10 centipoises and an acetone viscosity of 5–200 centipoises and 25–100% (based on the weight of the cellulose ester) of a mixture of a phthalate selected from the group consisting of dicapryl phthalate, diethoxyethyl phthalate, and dibutoxyethyl phthalate, and butyl stearate, the ratio of the former to the latter being within the range of $\tfrac{3}{2}$ to $\tfrac{1}{4}$, forming a non-tacky, abrasion-resistant coating upon the surface of the paper.

9. A method of forming a protective coating on a cellulose web which comprises applying to at least one of the surfaces of the web a thin layer of a composition in molten, fully fluid condition essentially consisting of a cellulose ester having a butyryl content of at least 42%, hydrolyzed to no more than two hydroxyl groups per 24 cellulose carbon atoms a melting point less than 200° C., a char point of at least 260° C., a cuprammonium viscosity of not more than 10 centipoises, and an acetone viscosity of 5–200 centipoises and 25–100% (based on the weight of the cellulose ester of a mixture of butyl stearate and a phthalate selected from the group consisting of dicapryl phthalate, diethoxyethyl phthalate and dibutoxyethyl phthalate, both components of the plasticizer mixture being present in an amount at least 20% of that mixture.

MARTIN SALO.
HAROLD F. VIVIAN.